Jan. 21, 1936.                J. C. WILSON                2,028,637
              REVERSIBLE MOUNTING FOR TROLLEY WHEELS
                       Filed March 31, 1934
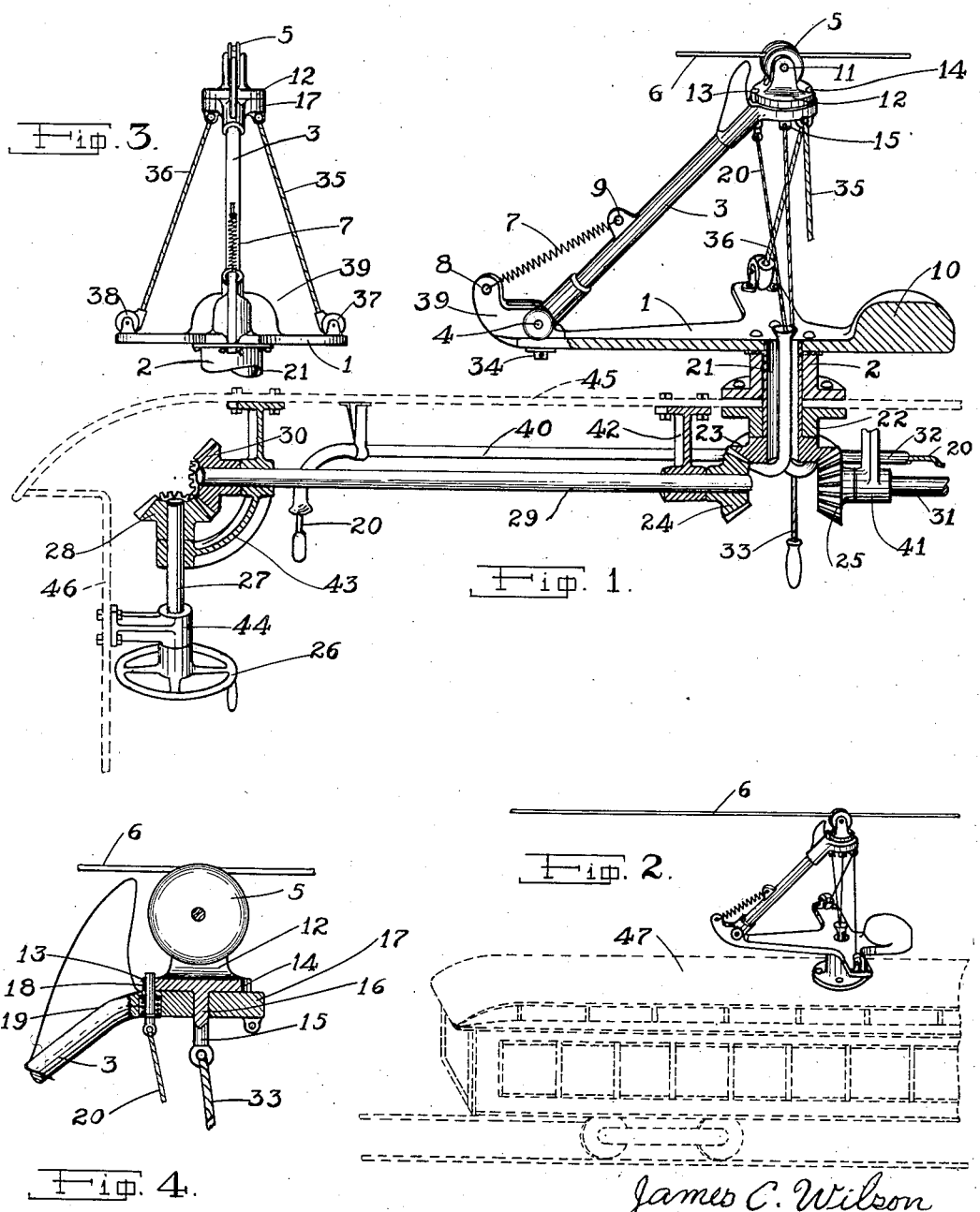

Patented Jan. 21, 1936

2,028,637

UNITED STATES PATENT OFFICE 2,028,637

REVERSIBLE MOUNTING FOR TROLLEY WHEELS

James C. Wilson, Pawnee, Ill.

Application March 31, 1934, Serial No. 718,408

3 Claims. (Cl. 191—64)

My invention relates to supports for trolley poles and trolley wheels; an object being in my device to provide a convenient and practical and simple mounting for trolley wheels which may be readily and easily reversed from within the vehicle on which it is operatively mounted.

A further object of my invention is to provide a reversible mounting for trolley wheels which will be practical and be useful on a street car, interurban car, mine motor, trolley busses, subway trains and other electrically driven vehicles and to connect the same with control mechanism permitting the control of the reversible mounting to be operated from within the vehicle when the same may be of closed construction.

I attain the objects of my invention in the device described in the annexed specifications, recited in the claims and illustrated in the accompanying drawing in which like reference numerals indicate like parts in the several figures.

Referring to the figures:

Figure 1 is a perspective of a vertical section through a portion of my invention and its control mechanism.

Figure 2 is a perspective of the outside top assembly of my reversible mounting device.

Figure 3 is a front view of the reversible mounting device for trolley wheels of my invention.

Figure 4 is a vertical half-section through a trolley harp and a portion of the top end of a trolley pole disclosing the details of the mounting for the trolley harp on the trolley pole.

Referring in detail to the construction of my device and the preferred manner of operating the same, I present as my invention a pivotally mounted frame member 1, resting upon a support 2 for rotation thereon; and a trolley pole 3 pivotally mounted on frame 1 at the forward end thereof on a pin 4 and resiliently lifting a trolley wheel 5 into engagement with trolley wire 6 by a spring member 7 attached to frame 1 at its forward end 8 and to trolley pole 3 at a point 9 intermediate the ends of the pole.

Although it may not be necessary always for the successful operation of this device I prefer to provide a counter-balance 10 on frame 1 to aid in steadying the support of trolley pole 3 in its operative position.

Trolley wheel 5 is supported on pin 11 of trolley harp 12. Harp 12 has a forward notch 13 and a rearward notch 14.

Vertical axis 15 of trolley harp 12 extends down through a hole 16 in the top end 17 of pole 3 while a plunger 8 mounted in connection with a spring 19 is adapted to engage notches 13 and 14 when respectively in registry therewith.

For instance: In Figure 4 where plunger 18 is holding trolley harp 12 by engaging notch 13 thereon that engagement may be released by the operator pulling down on cord 20 to permit trolley pole 3 to be reversed while trolley wheel 5 holds to its engagement with trolley wire 6 and thus bringing plunger 18 around where it will engage notch 14 in the harp.

Thus plunger 18 effectively acts as a means of holding the trolley harp and trolley pole and wheel in proper alignment when in operation.

A marked convenience is provided in the arrangement permitting the trolley to be reversed on top of the vehicle by the vehicle operator stationed within the interior thereof; and there are numerous mechanical methods by which the operator's control of the reversing operation for the trolley may be obtained. However, for the sake of explanation of the trolley mounting control of my invention I have illustrated in Figure 1 a mechanical means of controlling the adjustment of the trolley mounting.

With this arrangement I have provided a sleeve 21 operatively mounted upon a bearing support 2 and bearing 22 adapted to support frame 1 and the trolley pole and wheel and adapted to be rotated through gear 23 alternately acted upon by gear 24 and gear 25 from the respective ends of the vehicle where a control therefor is required at each end.

It will be observed that the trolley mounting of my invention may be mechanically controlled in its reversing operation in this illustrated arrangement by the vehicle operator turning hand wheel 26 causing shaft 27 to rotate with gear 28 turning shaft 29 through gear 30 and rotating gear 23 through gear 24. Thus through the roof of the vehicle sleeve 21 is rotated as it carries frame 1 with trolley pole 3.

Where a vehicle is equipped to be operated from either end a control mechanism like the parts controlled from hand wheel 26 up to sleeve 21 is provided wherein a shaft 31 controls gear 23 through gear 25 with the other parts not shown in the drawing.

In the construction shown it will be seen that plunger 18 in the upper end of trolley pole 3 normally holds trolley harp 12 in proper alignment with the trolley pole while trolley wheel 5 rides the wire 6; but when it is desired to reverse trolley pole 3 the operator first pulls down on cord 20 to release plunger 18 from its engagement with notch 13 or 14, as the case may be, and then while the plunger is retracted hand wheel 26 is turned, resulting in rotatably reversing trolley pole 3 about pin 15 of trolley harp 12 while at the same time spring 7, causing an upward pressure against harp 12, keeps trolley wheel 5 into engagement with wire 6 while pole 3 is being reversed. When pole 3 is lined up in its reverse position plunger 18 will automatically snap back into engagement with its new position in notch 13 or 14 as the case may be through the action of plunger spring 19.

Trolley pole 3 with trolley wheel 5 and harp 12 may be pulled down from its engagement with wire 6 by the operator pulling on rope 33 and by the same control rope the trolley wheel 5 may be replaced on wire 6 should it become detached therefrom.

The bottom end of trolley pole 3 is preferably mounted on a swivel support anchored by pin 34 in frame 1 so that where my device may be adapted to a trolley bus then the trolley pole may swing out to one side or the other freely and where necessary plunger 18 may be temporarily held in retracted position permitting pole 3 thus to freely oscillate under harp 12 about pin 15.

Although it will be possible to stabilize pole 3 in numerous ways yet I have elected to show a pair of snubber ropes 35 and 36 operating from snubbers 37 and 38 respectively in their mounting on frame 1 with these ropes each engaging the top end 17 of a trolley pole 3 so that snubbers 37 and 38 may have a tendency to hold trolley pole 3 from going too high and yet allow a sufficiently free movement up and down in its swivel support 39 to permit the trolley wheel 5 to follow wire 6.

I have chosen to illustrate a tube 40 and a tube 32 for housing control cord 20.

The control mechanism as illustrated for manipulating the reversible mounting device of my invention is shown supported by brackets 41, 42, 43, and 44.

In Figure 1, the reversible mounting and control mechanism are shown operatively secured to a vehicle roof 45 and side walls 46 are shown in dotted lines while in Figure 2 a conventional representation of a vehicle 47 is shown in dotted lines.

Having thus described the nature of my invention what I claim is:

1. A reversible mounting for trolley wheels comprising a frame, a vertical pivotal support therefor, a trolley pole pivotally mounted on the frame, and a trolley harp pivotally supported at the end of the trolley pole about a vertical axis and normally positioned substantially vertically above the pivotal support for said frame; means operatively connected with said frame for the horizontal rotation thereof upon its pivotal support, means for holding said trolley wheel in alignment with said trolley pole when in use, and means for releasing said holding means to permit the trolley pole to rotate with the frame support therefor while the wheel remains on the trolley wire.

2. In combination with an electrically driven vehicle body and support therefor, a reversible mounting for trolley wheels comprising a vertical pivotally mounted frame, mechanical means for the rotation thereof, a trolley pole pivotally and resiliently supported at the free end of said frame, a trolley harp pivotally mounted on a vertical axis and normally positioned substantially vertically above the pivotal support for said frame, and a resilient trigger for engaging said harp to hold the same in line with said trolley pole; said trigger adapted to be manually released from said engagement when it is desired to rotate said trolley pole with said frame while leaving said trolley wheel in engagement with a trolley wire on which it is adapted to operate.

3. In an electrically driven vehicle adapted to receive power from a trolley wire, the combination comprising a pivotally mounted trolley pole supporting frame and a trolley pole pivotally and resiliently secured to the free end of the frame, a trolley harp pivotally mounted on a vertical axis on the pole and normally positioned substantially vertically above the pivotal support for said frame, and a trolley wheel pivotally mounted on a horizontal axis in the harp, a pair of snubbers operatively mounted on said frame and controllably connected with said trolley pole adjacent to top thereof for holding said trolley pole within predetermined limits of elevation, a resiliently mounted trigger for engaging said trolley harp and holding the same in line with the trolley pole when in use, and means connected with said trigger for optionally releasing said engagement for rotating the trolley pole independently of the trolley harp and wheel; mechanical means connected with said pivotal support of said frame for placing the control of said mounting within convenient reach of the vehicle driver.

JAMES C. WILSON.